J. G. CAPSTAFF.
PROJECTION PRINTER.
APPLICATION FILED APR. 12, 1920.
1,361,012.
Patented Dec. 7, 1920.
4 SHEETS—SHEET 3.
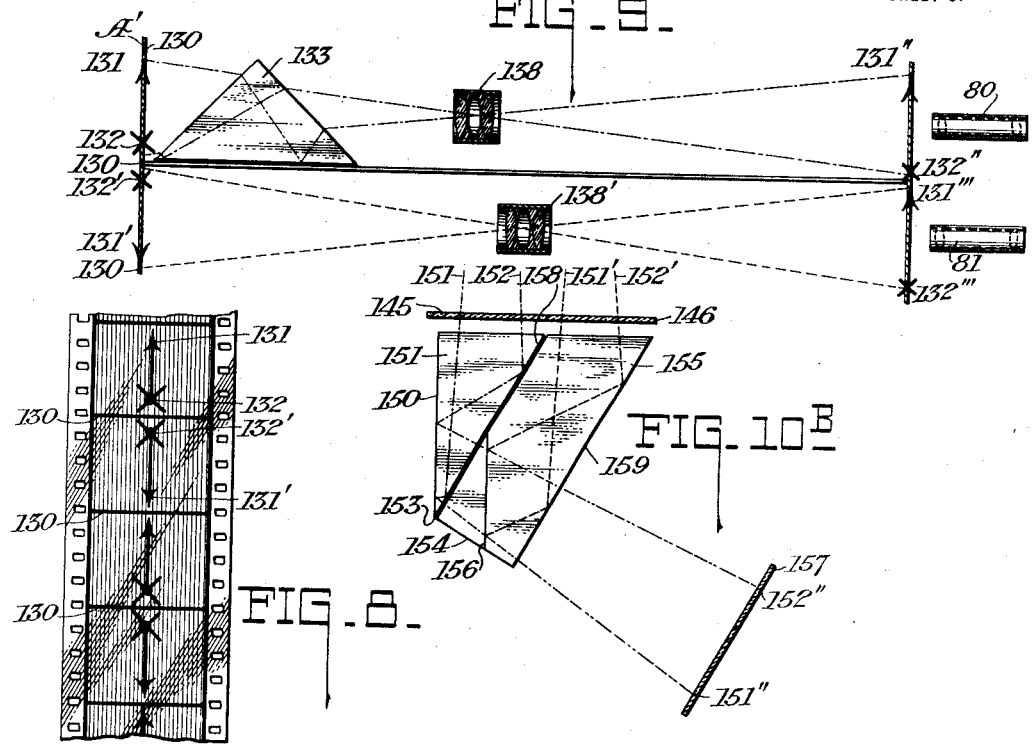
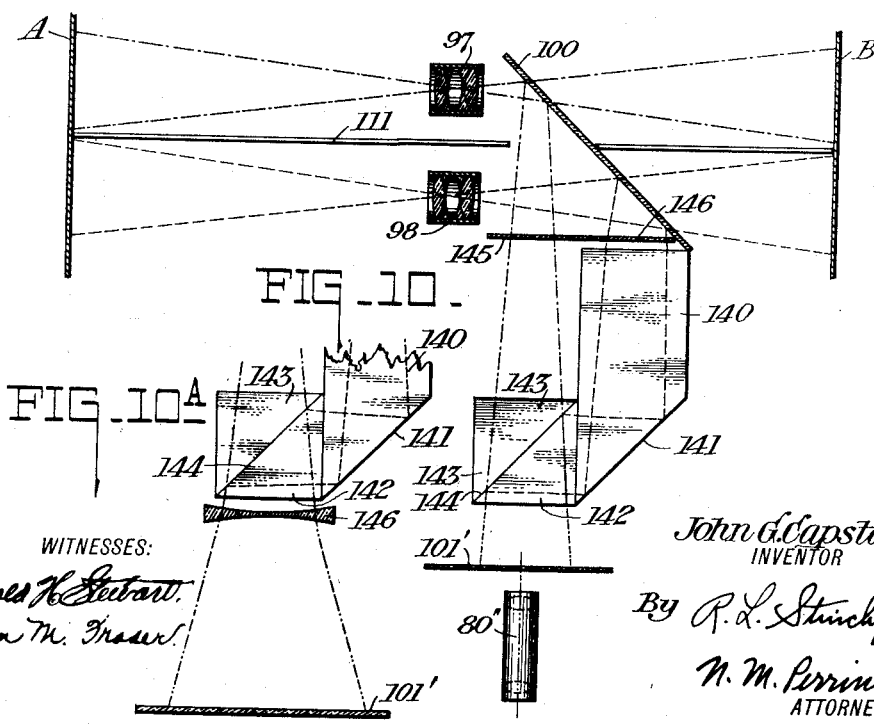
WITNESSES:
John G. Capstaff,
INVENTOR
By R. L. Stinchfield
N. M. Perrins
ATTORNEY

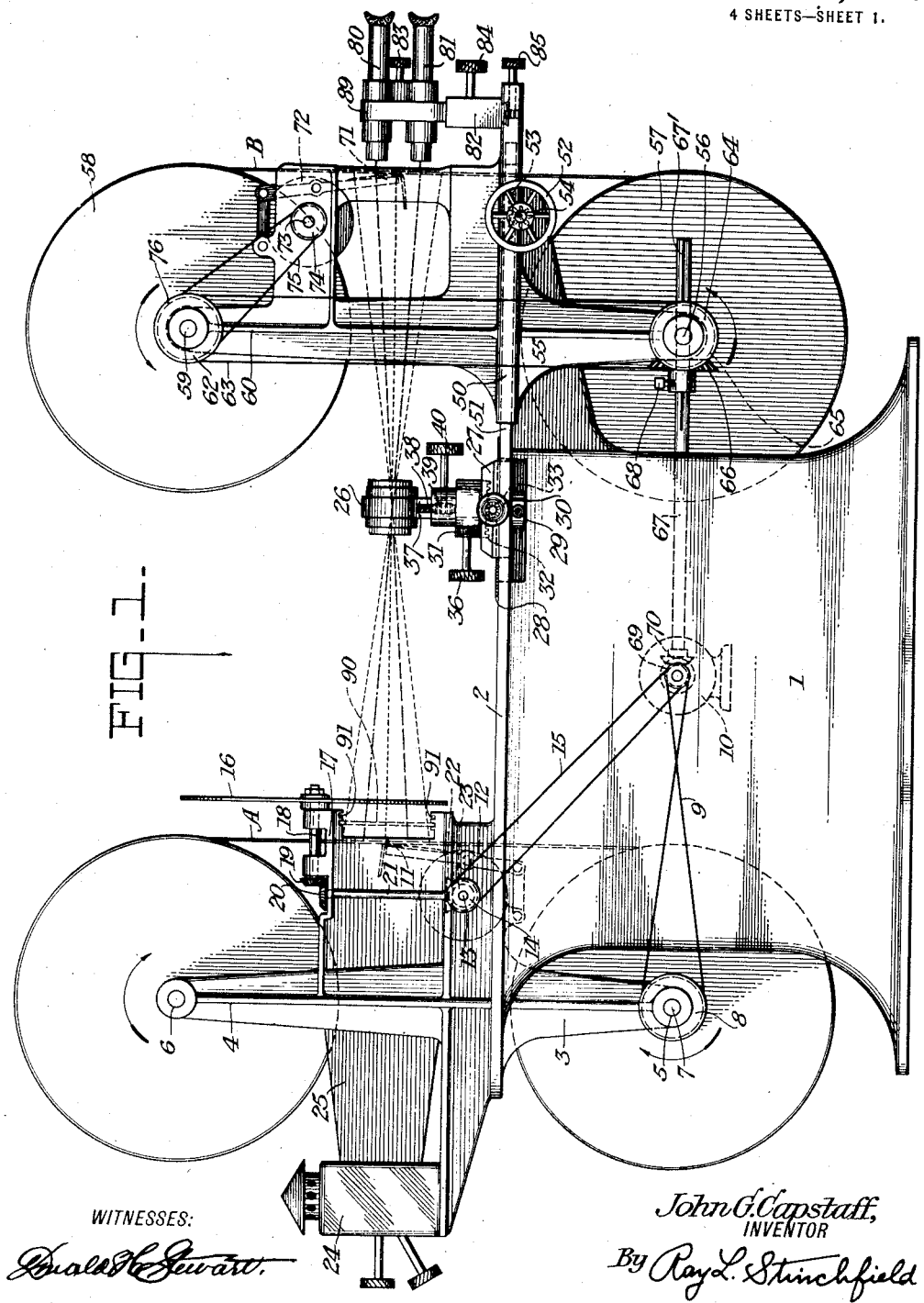

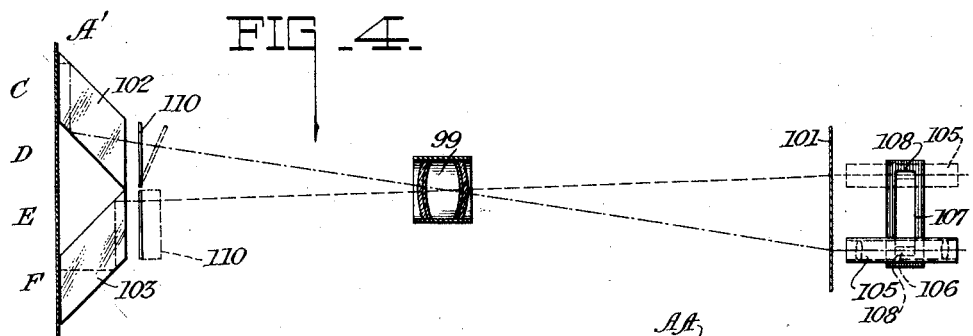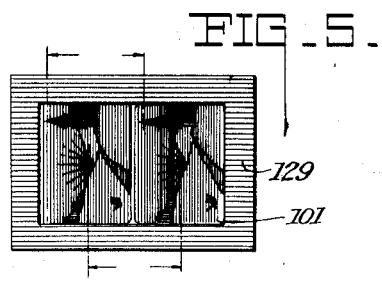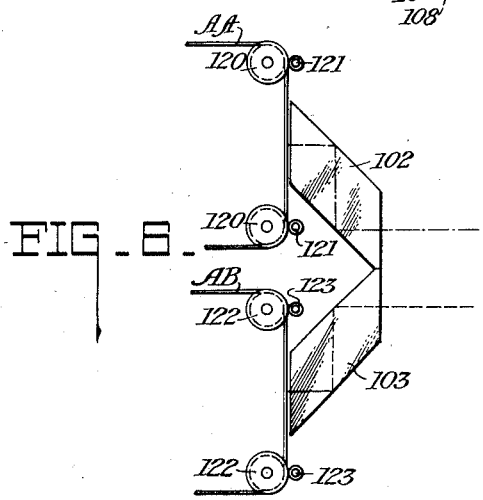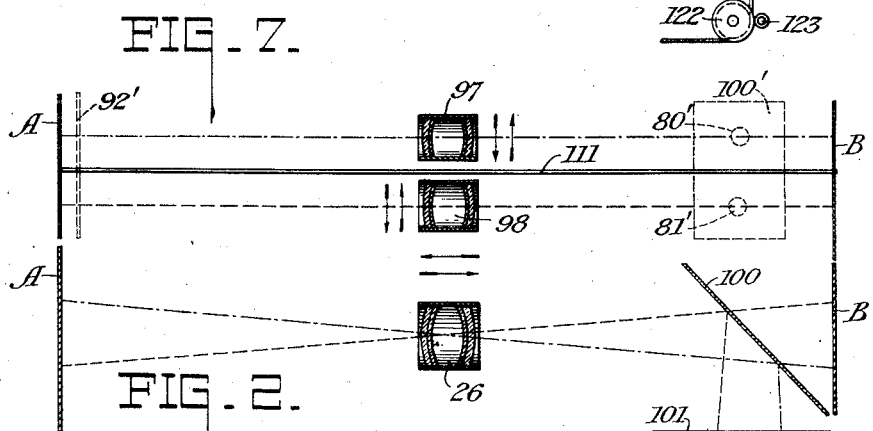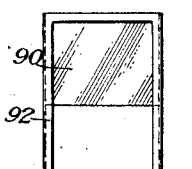

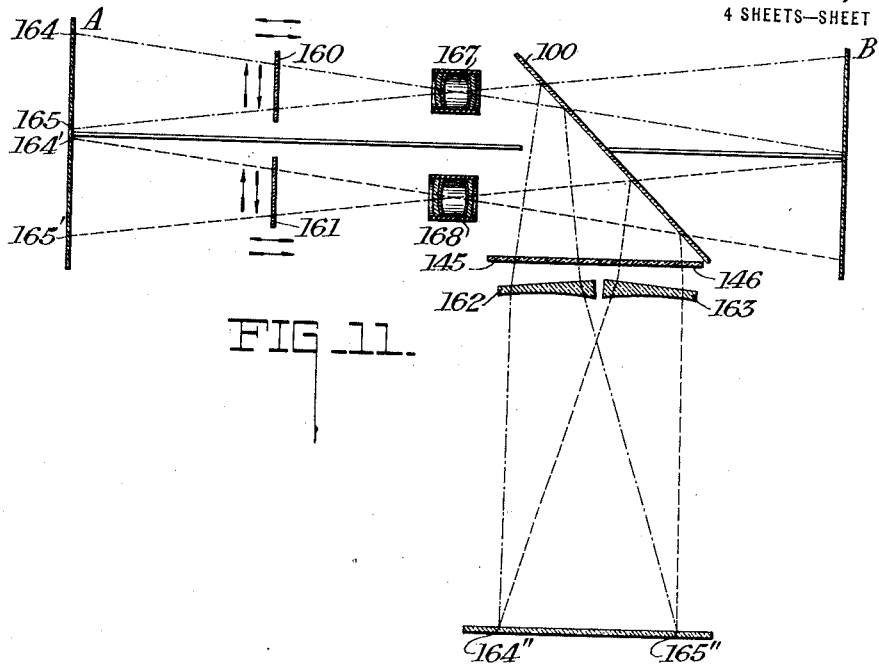

UNITED STATES PATENT OFFICE.

JOHN G. CAPSTAFF, OF ROCHESTER, NEW YORK, ASSIGNOR TO EASTMAN KODAK COMPANY, OF ROCHESTER, NEW YORK, A CORPORATION OF NEW YORK.

PROJECTION-PRINTER.

1,361,012.　　　　Specification of Letters Patent.　　Patented Dec. 7, 1920.

Application filed April 12, 1920. Serial No. 373,408.

*To all whom it may concern:*

Be it known that I, JOHN G. CAPSTAFF, a subject of the King of Great Britain, residing at Rochester, in the county of Monroe and State of New York, have invented certain new and useful Improvements in Projection-Printers, of which the following is a full, clear, and exact specification.

This invention relates to an apparatus for photographically printing by projection. While I contemplate the application of my invention to other uses, it relates particularly to a printer designed for use at one stage in the making of motion picture reproductions by the color process described in my Patent No. 1,196,080. In carrying out my process, two color records are made, which in motion picture work will constitute two series of images. These may be on different films or on the same film. From these color records is made a master positive which is usually a series of records on a continuous strip of film, the records of the two color series alternating. From this master positive, images are printed upon opposite sides of a double coated film, in the manner described in my British Patent No. 13,430 of 1915. This double coated film is then preferably treated in the manner described in my above mentioned Patent No. 1,196,080.

As is well known, photographic film shrinks in the course of its treatment, and if the master positive is printed by contact from a developed negative which has shrunk, errors will be introduced. This is particularly true if on a single long strip of master positive are printed a number of different scenes taken from negatives exposed and developed at different times and under different circumstances. It is customary to join a series of such scenes and print them together. As the amount of shrinkage will vary in the different scenes, the error in the positive will not be uniform. If a master positive having this lack of uniformity is used, it is necessary to adjust the optical system shown in my above mentioned British patent between each scene so as to insure proper registry and focus of the images on opposite surfaces of the double coated film.

There are several ways in which these corrections may need to be made. The shrinking of a particular piece of film will cause a comparatively uniform diminution of all the records on that piece, so that a change in magnification in projecting these images may be all that is necessary. Where, however, the two color records are taken through different lenses, the two images may be out of registry in a lateral direction and also the fields may not correspond exactly in a vertical direction. In such a case it may be necessary to magnify each field and adjust them until the areas displayed correspond throughout. If the two lenses are not of identical focal length, one color record may require a greater degree of magnification than the other. Moreover, the density ratio of the two images may require alteration.

In accordance with my invention I have overcome all these variations in the master positive due to such differences in the negative so that when the positive has been made it will be uniform throughout, and when the printer for projecting images therefrom upon the double coated film has once been set, it may be used continuously for repeated printings from the same positive without further re-setting. I have accomplished this by providing means for projecting two at a time the color records upon a screen that will show the images as they will be impressed on the exposure gate through which sensitized material passes, and in providing means for accurately measuring the separation between any corresponding points in the two projected images, and in providing means for varying simultaneously or independently the position or magnifications of the projected images until the desired standard separation for corresponding points is attained.

The separation of corresponding points may be measured in a variety of ways, but it is essential in all of them that some means be provided for comparing the separation with a standard separation and that means be provided for adjusting the optical systems to overcome any errors.

There will occur to a skilled workman or designer numerous mechanical and optical equivalents for the particular specific devices shown and described. I have therefore illustrated certain equivalent devices so as to indicate that the scope of my invention is not limited structurally except as defined by the appended claims.

It is obvious that any usual means may be used to obtain the original negatives, that any known process may be used to obtain and color the final images, and that the apparatus may be used to make a uniform negative from positive. I do not limit myself to any particular color process, nor to a color process, but propose to use this projecting printer wherever it may be necessary or desirable to print, two at a time, projected images in which the corresponding points should be accurately registered or located.

Reference will now be made to the accompanying drawings, in which the same reference characters refer to like parts throughout and in which:

Figure 1 is an elevation of one embodiment of my invention;

Fig. 2 is a diagram of modification thereof;

Fig. 3 is a view of a removable slide;

Fig. 4 is a diagram of another modification;

Fig. 5 is a view of two images as projected at the exposure gate;

Fig. 6 is a diagram showing the use of two negative films;

Fig. 7 is a diagram of still another modification;

Fig. 8 shows a specific form of negative film;

Fig. 9 shows diagrammatically a projection system to be used in printing from the film shown in Fig. 8;

Fig. 10 shows diagrammatically an embodiment of my invention in which superposed images may be examined.

Fig. 10$^A$ is a modification of a part of Fig. 10;

Fig. 10$^B$ is another modification of a part of Fig. 10;

Fig. 11 is a diagram of still another embodiment of my invention.

It is to be understood that the particular mechanical structures described are purely illustrative and that I contemplate the use of any equivalents therefor. Fig. 1 shows such an illustrative embodiment of a simple form of my invention. Base 1 has a top 2 which forms a table supporting the various parts of the mechanism. At one end are brackets 3 and 4 having bearings 5 and 6 in which film reel carriers are mounted, the negative film A being shown between the reels. The wind-up reel is mounted on the lower carrier and is operated through shaft 7 by means of a pulley 8 driven through belt 9 by motor 10 within the base. Film A is intermittently drawn from the upper reel by actuator 11, operated through wheel 12, fastened on shaft 13, and driven by pulley 14, belt 15, and motor 10. This film actuating mechanism may be of any desired type and that here shown is illustrative only, being similar to that shown in Patent No. 627,526. A shutter 16 is mounted on stub shaft 18 carried in bearings on casting 17, and is rotated through bevel gears 19 and 20, shaft 21 and bevel gears 22 and 23, the latter turning with shaft 13.

From lamphouse 24 light is furnished through cone 25, which may contain suitable condensers, not shown. Upon the support 2 is adjustably mounted a projecting lens in a mount 26. The carriage 27 is slidable along tracks 28 and may be fastened in any location by lever 29. A fine adjustment is secured by moving block 31 relative to the carriage by means of rack 32 and pinion 33, operated by hand wheel 30. Vertical adjustment is secured by the movement of yoke 37 by rack 38 and pinion 39, operated by hand wheel 40. By a similar structure, hand wheel 36 operates a horizontal adjustment. It is thus evident that the lens is adjustable in any direction.

Upon the end of the table opposite to the negative film carrier is a carriage 50 movable on rails 51 of the table 2 by means of hand wheel 52, operating through rack 53 and pinion 54. Carriage 50 carries all the operating parts for the sensitized film B, and is provided with a downwardly extending bracket 55, supporting on shaft 56 a supply reel container 57, the take-up reel container 58 being mounted on shaft 59, supported in bracket 60. Shaft 59 is driven by pulley 62 through belt 63, and pulley 64, keyed to shaft 56 which also supports bevel gear 65, meshing with a second bevel gear 66 which is fastened to shaft 67 so as to rotate therewith by means of a key which fits in slot 67', so that gear 66 may slide on shaft 67 and be fastened at the desired point by set screw 68. When carriage 50 is moved along track 51, gear 66 is slid along shaft 67 until it meshes with gear 65 and is then fastened against longitudinal movement by set screw 68. Shaft 67 is driven by motor 10 through bevel gears 69 and 70. Film B is moved by an actuating mechanism 71 operated through wheel 72, affixed to shaft 73, which is driven by pulley 74 through belt 75 and pulley 76 fastened to shaft 59. The film actuating mechanism is similar to that used with film A, and is timed to operate synchronously therewith but in the opposite direction, this being necessary only if the order of the records is to be the same in both films. The mechanism is designed to advance the film by the width of two picture areas at each operation. Shutter 16 is also designed to operate in proper synchronism with the take-up mechanism. A carriage 82 is mounted on carriage 50 and is laterally adjustable thereon by a hand wheel 85, operating a rack and pinion. This carriage carries a support 89 which is similarly vertically adjusted by hand wheel 84 and carries two optical magnifiers 80 and 81, the separation between which may be slightly adjusted by set screw 83.

It is to be understood that the above apparatus as specifically described is illustrative only, that the details of the particular adjusting means and film actuating means are immaterial, and that the structure is shown in a simple manner so as to illustrate clearly the principles of my invention.

The operation and functions of the structure as thus far described will now be stated. The negative film A here used will preferably contain two alternating series of color records, and the apparatus is designed to print two adjacent corresponding color records simultaneously upon film B. Film A will, however, have shrunk in the course of the photographic processes to which it has been submitted, and different specimens of negative film will have shrunk differently. It is highly desirable that all the images printed on film B have the same magnification and relative position in their picture areas. The magnifiers 80 and 81 are therefore set that distance apart which it is desired shall be the separation between corresponding points on adjacent picture areas. Before film B is threaded into position, a focusing screen is placed in the exposure gate, and the image of two adjacent color records of film A is thrown on the gate. One of the magnifiers is then set so that a distinctive point on one record registers with the central crosshair of the magnifier and then an observation is made through the other magnifier. If the corresponding point is opposite the central crosshair thereof, the magnification is as desired; but if not, the optical system is adjusted by means of the adjustments described until both images are properly focused and at the desired separation. Ordinarily the only adjustment that will be found necessary is that of the lens along its axis. This will produce the desired slight change of magnification without materially disturbing the focus.

In all color processes it is essential that the exposure ratio be correct. This ratio is attained if possible in the camera, the endeavor being to secure such a relation between the densities of the two color records that when submitted to standardized operations they will cause the colors to be in the proper ratio in the final projected images. If the ratio in the negatives is incorrect, I propose to insert in the path of the light rays a density screen that will absorb some of the light from one of the projected images. By a proper selection of screen, the correct exposure ratio will be obtained. It sometimes happens, when the color records are taken simultaneously through different lenses, that their focal length is not identical, so that the magnifications are slightly different. This can be compensated for by the insertion in the path of one projected image a sheet of glass which will change the equivalent projecting distance and alter the magnification slightly. A holder 92 for such a density screen or glass plate is shown in Fig. 3, an element 90 being shown in place therein. This holder is slipped into registering grooves 91. Several sets of grooves are provided for the insertion of different correcting holders having additive effects on the projected images. The projected images are thus independently adjustable.

In Fig. 2 is shown a diagram of a desirable arrangement for examining the image without removing the film B from the exposure gate. It is frequently desirable to examine the images and alter the adjustments during the printing of a master positive, particularly when printing from a negative made up of several films spliced together. For this purpose I interpose a sheet of transparent glass 100 in the path of the projected rays which transmits most of the rays to the sensitive area at B, while reflecting enough light to a focusing screen 101 to permit of the examination of the image by the magnifiers 80 and 81. The glass plate and focusing screen are accurately mounted with respect to the exposure gate, so that the images are identical and an examination of the focusing screen provides an accurate determination of the separation of corresponding points at the exposure gate.

In certain well known cameras corresponding color records taken on a continuous film are not adjacent one another but are separated by several intervening exposure areas. In order to obtain from such records master positives in which the corresponding color records are adjacent, I employ the optical system shown in Fig. 4. On negative film A', C and F indicate two corresponding color records separated by intervening areas D and E. There are introduced in front of areas C and F prisms 102 and 103 each having two internally reflecting surfaces from which the light from C and F pass through projecting lens 99 to the focusing screen 101. In this figure is shown a modification of the means for measuring the separation. Instead of using two magnifiers, only one is used. This, designated 105, is carried by a lug 106, slidable in slot 107, the ends of which form abutments or stops in the support 108. The parts are so designed that the terminal positions of the magnifier correspond to the desired separation. A reading is made with the magnifier at one end of the support, and it is then moved to the other end and another reading made. I also show in this figure a modification in the means by which the images may be separately adjusted. This comprises plates of glass 110 swingable about vertical and horizontal axes in the manner described in Patent No. 1,208,490. The upper plate is shown in dotted lines swung about a horizontal axis and the lower plate in dotted lines as swung about a vertical axis.

If the color records are taken on two separate films, the same optical system is used as shown in Fig. 6 in which film AA containing one series of color records passes between guide rollers 120, 121 in the rear of prism 102, and the other film AB carrying a second series of color records passes between guide rollers 122, 123 in the rear of prism 103.

It is also within the scope of my invention to project the images from film A by two separate lenses 97 and 98 upon the film B. In this case a partition 111 separates the optical projecting systems. Each lens is adjustable in all directions, the arrows being intended to represent adjustments of every kind. Holders 92' for density screens are indicated, as well as reflecting glass plates 100', which reflect the rays at right angles to the plane of the paper, upon a suitable screen, the positions of the magnifiers being indicated at 80'—81'. In use, it will normally be necessary to adjust but one of the lenses. Taking the setting of one as a standard, the other will be adjusted until the image through it is correctly spaced from the stationary image through the other.

Fig. 5 shows a view of the gate 129 with two records projected on a focusing screen 101 therein. In this, arrows indicate the position of two corresponding points in each record. It is obvious that certain sharply defined points in the records will be best for observation, and by making the magnifying system adjustable in position any such points may be selected. It will be preferable also to make observations on a series of points to assure that there is uniform separation over the entire field.

In certain systems alternate images are inverted, the negatives appearing as in Fig. 8, corresponding points on two adjacent areas being designated 131 and 131', 132 and 132'. It is desirable to invert one and not the other in making the master positive so that the latter will consist of a series of images arranged in the same relative position. A diagram of a projecting system whereby this may be accomplished is shown in Fig. 9. The negative film is indicated at A', the edges of the picture areas being diagrammatically indicated by marks 130.

For the sake of clearness corresponding characters 131, 131', 132, 132' are also indicated to show their position on the picture areas. The system consists of two projecting systems, having independently adjustable lenses 138, 138'. An inverting prism 133 is placed in one of the systems. By tracing the paths of the rays it is obvious that the image in the system containing the prism will not be inverted, the points 131, 132 being reproduced at 131''; 132''; and that in the other system they will be inverted points 131', 132' being reproduced at 131''', 132'''. It is obvious that the optical paths in the two systems are not of the same length and lens 138 must be of suitably greater focal length than 138' to produce an image of the same size. It will be positioned a material distance to one side of the other lens, as indicated. Microscopes 80 and 81 are indicated as in the other diagrams.

I have also devised a method by which the determination of the separation may be made by superposing the images, projected through contrasting color screens, so that lack of registration will be immediately evident by the presence of color fringes. This method is adaptable to any of the projecting systems, but will be shown as applied to the form having two independently adjustable lenses.

In Fig. 10, such a system is illustrated diagrammatically. Images on the negative film A are projected by independently adjustable lenses 97 and 98 on the sensitive film at B. There is interposed a mirror 100, which, like the mirror used in all the diagrams, may be an opaque mirror, reflecting all rays and placed in position only during the setting of the instrument but preferably it will be a fixed transparent mirror consisting of a plate of glass the surface of which will reflect a certain proportion of the rays, or it may be a semi-transparent mirror of platinized glass reflecting part of the rays and transmitting the rest.

The two images are superposed by means of a well known optical expedient consisting of a block of glass 140, having an internally reflecting surface 141, and two prisms 142, 143, having at their contacting faces a platinized, semi-transparent reflecting surface 144. The length of the block 140 is such as to equalize the optical paths of the two systems, so that the images will finally be superposed in an obvious manner on the screen 101'.

Color screens corresponding to those through which the negatives were originally made in the taking camera are placed at 145, 146 so that the resultant image in 101' will be an additive one, which will be similar to the subtractive color image eventually to be projected when the final double coated film is finished and used in accordance with my patents above mentioned.

Any lack of registry in the superposed images on 101' will be very easily perceptible in the form of color fringes. This method of inspection may be used to standardize the separations when printing from different negatives having different errors. A standard positive is introduced at A and the apparatus set so that when the images at B are separated by a standard distance the images at 101' will be in suitable registry. In this initial setting the prisms will have to be properly adjusted.

When another piece of film is introduced at A, and the images are seen to be out of registry at 101', one lens, as 97, and the prisms are not touched, but all changes are made by the other lens. Since the image projected through one optical system is fixed, it necessarily results that when the other projected image registers therewith, the separation will be the standard one. If both lenses were adjusted the images could be brought into registry with a separation different than the standard. The apparatus described, however, as used, constitutes, like all the other systems described, a means for inspecting the images as projected at the exposure gate and for measuring their separation and comparing it with a predetermined standard. If desired, a magnifier 80" may be used to inspect the focusing screen. If desired, however, a dispersing lens 146 may be placed so as to enlarge the projecting image, in which case screen 101' must be moved to a greater distance, this modification being indicated in Fig. 10^A.

Another arrangement of prisms whereby the images may be superposed is indicated in Fig. 10^B in which the color screens are designated at 145, 146, being in the same relation to the projection system as in Fig. 10. This system consists of a prism 151 having a totally reflecting surface 150. This prism is separated at 153 by a slight airspace from the prisms 154, 155 of the form shown, which are in turn separated by a semi-transparent reflecting surface 156. Rays from point 151 are brought to a focus at 151" on the screen, after being reflected internally from surfaces 158 and 150 of prism 151 and passing through surface airspace 153, surface 156 and surface 159. Rays from 151' are also brought to a focus at 151" after being internally reflected by surface 159, reflected from 156, and passing through surface 159. The manner of using the projection system is the same as already described in connection with Fig. 10. I do not claim as my invention the particular prism arrangements shown, but I do claim the use of them or any equivalent image superposing means with the adjustable projection system.

Still another system is shown diagrammatically in Fig. 11. In this system the images at A are projected upon B by the objectives 167, 168, which are not ordinarily adjusted, after the initial setting, the adjustment being secured by weak lenses 160, 161, which may be negative or positive, the arrows indicating adjustment in all directions. The beams are reflected by a mirror 100, similar in every way to those previously described, and the reflected rays pass through color screens 145, 146. They then traverse two weak dispersive lenses, one in the beam of projected light from each picture area. These lenses 162, 163, are mounted eccentrically, so that the rays of one beam pass entirely to one side of the center of the lens. In other words, only half lenses are used, the thick edges being adjacent as shown. The images are thus refracted and brought to registry as shown, rays from 164 and 164' being brought to a focus at 164" and those from 165 and 165' at 165". After being once set, lenses 162 and 163 are not adjusted, nor are lenses 167 and 168. Normally only one of the lenses 160, 161 will be adjusted for any particular setting. The inspected image on the focusing screen will be on an enlarged scale and the presence of color fringes will be the more easily detected.

In certain of the diagrams it has been necessary to magnify the distance from the lens to the focusing screen in order to show clearly the optical system, but it is to be understood that in all cases the image will be sharply focused on both the screen and the negative film. I find a lens of about 100 mm. focal length convenient, so that the two films are separated by about 400 mm., giving approximately unit magnification and the other dimensions are necessarily based on the focal length of the lens. This may, of course, vary within wide limits.

As, obviously, the mechanical details would merely complicate the figures unnecessarily and as they are immaterial anyway, they have been shown only in Fig. 1, the other figures showing diagrammatically the optical systems only. It is to be understood, however, that adjustments and actuating mechanisms performing functions similar to those disclosed in Fig. 1 are to be used with these optical systems, and could be readily devised by a skilled instrument maker.

It is thus apparent that I have invented a machine which fulfills all the requirements outlined above and which may be used wherever it is necessary and desirable that such requirements be met. I contemplate as within the scope of my invention, as defined in the appended claims, all such mechanical and optical equivalents as will perform the functions specified.

Having thus described my invention, what I claim as new and desire to secure by Letters Patent is:

1. Apparatus for light printing by projection comprising means for holding in display position a plurality of record areas, an exposure gate, means for projecting simultaneously and side by side the images of the record areas upon the gate, means for measuring the distance between corresponding points on the projected images and means for changing the magnification of the projected images.

2. Apparatus for light printing by projection comprising means for holding simultaneously in display position two different photographic color records of the same subject, an exposure gate whereat an area of sensitized material may be exposed, optical means for projecting simultaneously and side by side the images of the record areas upon the gate, means for measuring the distance between corresponding points on the two projecting areas, and means for independently varying the magnification of the projected images.

3. In apparatus for the purpose specified, means for holding simultaneously in display position a plurality of record areas, an exposure gate, means for projecting simultaneously and side by side images of the record areas upon the gate, means for magnifying corresponding portions of the projected images and for determining the separation of corresponding points in such portions, and means for varying the magnification of the projected images.

4. An apparatus for the purpose specified comprising means for holding simultaneously in display position a plurality of record areas, an exposure gate, whereat an area of photographically sensitive material may be exposed, means for projecting simultaneously and side by side images of the record areas upon said gate, means for determining the separation of corresponding points of the projected images and means for adjusting the projecting means to vary independently the magnification and position of the projected images and their exposure ratio.

5. In apparatus for the purpose specified means for holding simultaneously in display positions two color record areas, an exposure gate, means for projecting simultaneously and side by side, images of the record areas upon the gate, adjustable means for magnifying any corresponding portions of the projected images and for determining the separation of any corresponding points of the projected images, and means for varying the magnification of the projected images.

6. In apparatus for light printing by projection, means for feeding two series of color records, means for displaying simultaneously one record of each series, an exposure gate, means for feeding past said exposure gate a continuous strip of photographically sensitive material, means for projecting upon said exposure gate simultaneously and side by side images of the two displayed records, means by which corresponding portions of the projected areas may be magnified and their separation determined, said projecting means being adjustable to vary the magnification of the projected images.

7. In apparatus for light printing by projection, means for feeding in one direction two series of color records, means for displaying simultaneously two corresponding records, one from each series, an exposure gate, means for feeding in the opposite direction past said exposure gate, a continuous strip of photographically sensitive material, means for projecting upon said exposure gate simultaneously and side by side images of the two displayed records, means by which the separation of corresponding points may be exactly measured, said projecting means being adjustable to vary the magnification of the projected images, and means for varying the exposure ratio of the projected images.

8. In an apparatus of the kind described, means for feeding in one direction a continuous strip of film carrying two alternating series of color records, means for displaying simultaneously one record of both series, an exposure gate, means for feeding in the opposite direction past said exposure gate, a continuous strip of photographically sensitized material, optical means for projecting upon said exposure gate simultaneously and side by side images of the two records at the display position, adjustable means for determining the separation of any two corresponding points of the two projected images, and means for adjusting the projecting means to vary independently the magnification of each projected image, and to adjust each projected image laterally or longitudinally and means to adjust the exposure ratio of the two projected images.

9. Apparatus for light printing by projection comprising means for holding in display position a plurality of record areas, an exposure gate, means for projecting simultaneously and side by side the images of the record areas upon the gate, means for comparing the distance between corresponding points on the projected image with a predetermined standard, and means for adjusting this distance to make it conform to the standard.

10. Apparatus for light printing by projection comprising means for holding in display position a plurality of record areas, an exposure gate, means for projecting simultaneously and side by side the images of the record areas upon the gate, a focusing screen, means for reflecting certain of the projected beams upon the focusing screen, means for inspecting the images on the focusing screen and for comparing the separation of corresponding points of the two images as projected on the exposure gate with a predetermined standard, and means for adjusting the projecting means to cause the separation to conform to the standard.

11. Apparatus for light printing by projection comprising means for holding in display position a plurality of record areas, an exposure gate, means for projecting simultaneously and side by side the images of the record areas upon the gate, means for comparing the separation of corresponding points of the projected images with a predetermined standard, and means for adjusting one projected image independently of the other to cause the separation to conform to the standard.

Signed at Rochester, New York, this 7th day of April, 1920.

JOHN G. CAPSTAFF.